United States Patent [19]

Wang et al.

[11] Patent Number: 5,723,275
[45] Date of Patent: Mar. 3, 1998

[54] VINYLIDENE CHLORIDE CONTAINING COATING COMPOSITION FOR IMAGING ELEMENTS

[75] Inventors: Yongcai Wang; Charles Chester Anderson, both of Penfield, N.Y.

[73] Assignee: Eastman Kodak Company, Rochester, N.Y.

[21] Appl. No.: 712,016

[22] Filed: Sep. 11, 1996

[51] Int. Cl.$^6$ .................. G03C 1/89; G03C 1/93; G03C 1/053; B32B 27/30

[52] U.S. Cl. .................. 430/528; 430/215; 430/263; 430/529; 430/536; 430/537; 430/627; 430/961; 428/500; 428/522; 524/556; 524/559; 524/568

[58] Field of Search .................. 430/529, 536, 430/537, 627, 961, 215, 263, 528; 428/522, 500; 524/556, 559, 568

[56] References Cited

U.S. PATENT DOCUMENTS

| | | | |
|---|---|---|---|
| 3,895,949 | 7/1975 | Akamatsu et al. | 430/273 |
| 4,396,706 | 8/1983 | Ishii et al. | 430/961 |
| 4,497,917 | 2/1985 | Upson et al. | 523/201 |
| 4,629,677 | 12/1986 | Katoh | 430/263 |
| 4,954,430 | 9/1990 | Ishigaki et al. | 430/533 |
| 4,954,559 | 9/1990 | Den Hartog et al. | 524/507 |
| 5,006,451 | 4/1991 | Anderson et al. | 430/527 |
| 5,166,254 | 11/1992 | Nickle et al. | 524/512 |
| 5,204,404 | 4/1993 | Werner et al. | 524/501 |
| 5,219,916 | 6/1993 | Den Hartog et al. | 524/515 |
| 5,221,598 | 6/1993 | Anderson et al. | 430/527 |
| 5,314,945 | 5/1994 | Nickle et al. | 524/507 |
| 5,447,832 | 9/1995 | Wang et al. | 430/523 |

OTHER PUBLICATIONS

Journal of Applied Polymer Science, vol. 39, pp. 2119-2128, 1990.

*Primary Examiner*—Richard L. Schilling
*Attorney, Agent, or Firm*—Carl F. Ruoff

[57] ABSTRACT

The present invention describes an imaging element having a support, an image forming layer and at least one layer formed from an aqueous coating composition containing a film forming binder. The film forming binder is an interpolymer containing carboxylic acid groups. The interpolymer contains from 60 to 90 weight percent vinylidene chloride. The interpolymer has an acid number of from 30 to 150 and the carboxylic acid groups are reacted with ammonia or amine so that the aqueous coating composition has a pH of from 7 to 10.

21 Claims, No Drawings

5,723,275

VINYLIDENE CHLORIDE CONTAINING COATING COMPOSITION FOR IMAGING ELEMENTS

This application relates to commonly assigned copending application Ser. No. 08/712,006, Express Mail No. TB440987360 which is filed simultaneously herewith and hereby incorporated by reference for all that it discloses. This application relates to commonly assigned copending Ser. No. 08/712,018, Express Mail No. TB440987349 which is filed simultaneously and hereby incorporated by reference for all that it discloses. This application relates to commonly assigned copending application Ser. No. 08/712,019 Express Mail No. TB44098559X which is filed simultaneously herewith and hereby incorporated by reference for all that it discloses. This application relates to commonly assigned copending application Ser. No. 08/712,010, Express Mail No. TB44098735X which is filed simultaneously herewith and hereby incorporated by reference for all that it discloses. This application relates to commonly assigned copending application Ser. No. 08/712,017, Express Mail No. TB440987371 which is filed simultaneously herewith and hereby incorporated by reference for all that it discloses.

FIELD OF THE INVENTION

This invention relates in general to imaging elements, and in particular to imaging elements comprising a support material containing at least one auxiliary layer coated from an aqueous coating solution containing a film forming binder, wherein the binder comprises a vinylidene chloride interpolymer containing carboxylic acid groups. The invention provides coating compositions that have improved manufacturing and film forming characteristics. The auxiliary layer of the invention exhibits superior physical properties including exceptional transparency, abrasion resistance, barrier properties, and excellent adhesion to underlying and overlying layers.

BACKGROUND OF THE INVENTION

Layers of imaging elements other than the image-forming layer are commonly referred to as auxiliary layers. There are many different types of auxiliary layers such as, for example, subbing layers, backing layers, interlayers, overcoat layers, barrier layers, receiving layers, stripping layers, antistatic layers, transparent magnetic layers, and the like.

These auxiliary layers are often coated from organic solvent-based solutions to yield a continuous film upon evaporation of the solvent. However, because of environmental considerations it is desirable to replace organic solvent-based coating formulations with water-based coating formulations. The challenge has been to develop water-based coatings that provide similar physical and chemical properties in the dried film that can be obtained with organic-solvent based coatings.

Water insoluble polymer particles contained in aqueous latexes and dispersions reported to be useful for coatings on photographic films typically have low glass transition temperatures (Tg) to insure coalescence of the polymer particles into a strong, continuous film. Under the temperatures and, especially, the residence times employed during the coating and drying of coatings on photographic films, polymer particles with Tg as low as organic solvent "coalescing aids" to promote the formation of a void-free, continuous film that is useful as, for example, a barrier layer. For example, in Anderson, et. al., U.S. Pat. No. 5,006,451, vinylidene chloride-containing polymer latex barrier layers are described that utilize a coalescing aid to achieve non-permeable films. The coalescing aids are employed despite the fact that the polymer latexes have a Tg as low as 30° C.

The need to utilize a coalescing aid in imaging support coatings is undesirable for several reasons. Volatilization of the coalescing aid as the coating dries is not desirable from an environmental standpoint. In addition, subsequent recondensation of the coalescing aid in the cooler areas of the coating machine may cause coating imperfections and conveyance problems. Coalescing aid which remains permanently in the dried coating will plasticize the polymer and adversely affect its resistance to blocking, ferrotyping, and abrasion.

An approach reported to provide aqueous coatings that require little or no coalescing aid is to use core-shell latex polymer particles. A soft (low Tg) shell allows the polymer particle to coalesce and a hard (high Tg) core provides the desirable physical properties. The core-shell polymers are prepared in a two-stage emulsion polymerization process. The polymerization method is non-trivial and heterogeneous particles that contain the soft polymer infused into the hard polymer, rather than a true core-shell structure, may result (Journal of Applied Polymer Science, Vol. 39, page 2121, 1990). Aqueous coating compositions comprising core-shell latex polymer particles and use of such coalescing aid-free compositions as ferrotyping resistant layers in photographic elements are disclosed in Upson and Kestner U.S. Pat. No. 4,497,917 issued Feb. 5, 1985. The polymers are described as having a core with a Tg of greater than 70° C. and a shell with a Tg from 25° to 60° C.

U.S. Pat. No. 5,447,832 describes for imaging elements a coalesced layer comprising film-forming colloidal polymer particles and non-film forming colloidal polymer particles. Those layers are coated from an aqueous medium and contain polymer particles of both high and low glass transition temperatures. Typically, the film forming colloidal polymer particles consist of low Tg polymers, and are present in the coated layers from 20 to 70 percent by weight.

U.S. Pat. Nos. 5,006,451 and 5,221,598 disclose the use of polymer barrier layers applied over a vanadium pentoxide antistatic subbing layer that prevents the loss of antistatic properties in photographic film processing solutions. These barrier layers are applied from aqueous medium and provide excellent coating uniformity and adhesion to overlying gelatin-containing layers, but, they do not have the physical properties necessary to be effective backing layers for imaging elements.

U.S. Pat. No. 3,895,949 describes a photosensitive element having a layer of photosensitive material that is overcoated with a protective layer containing a copolymer obtained by reaction between about 10 to 70 percent by weight of an unsaturated carboxylic acid and at least one ethylenically unsaturated compound comprising up to 40 percent by weight of a hard component such as styrene or methyl methacrylate and about 50 to 30 percent by weight of a soft component such as ethyl acrylate, or butyl acrylate. Polymer particles that have such compositions are of low Tg, and therefore can coalesce and form a transparent film very easily under normal drying conditions used for manufacturing photographic elements. However, such low Tg polymers are not generally suitable as, for example, backing layers since their blocking and ferrotyping resistance are poor.

U.S. Pat. Nos. 5,166,254 and 5,219,916 describe a water-based coating composition containing mixtures of an acrylic latex and an acrylic hydrosol. The acrylic latex contains 1 to 15% of methylol (meth)acrylamide, 0.5 to 10% carboxylic acid containing monomer, and 0.5 to 10% hydroxyl containing monomer, and has a Tg of from −40° to 40° C. and a molecular weight of from 500,000 to 3,000,000. U.S. Pat. Nos. 5,314,945 and 4,954,559 describe a water-based coating composition containing an acrylic latex and a polyurethane. The acrylic latex contains 1 to 10% of methylol (meth)acrylamide, 0.5 to 10% carboxylic acid containing monomer, and 0.5 to 10% hydroxyl containing monomer, and has a Tg of from −40° to 40° C. and a molecular weight of from 500,000 to 3,000,000. U.S. Pat. No. 5,204,404 describes a water-based coating composition containing a mixture of a dispersed acrylic silane polymer and a polyurethane. The acrylic silane polymer contains 1 to 10% of silane containing acrylates, 0.1 to 10% of carboxylic acid containing monomer, and 2 to 10% of hydroxyl containing monomer. The polymer has a Tg of from −40 to 25° C. and a molecular weight of from 500,000 to 3,000,000.

Film formation from a coating composition in general involves the deposition of a coating liquid onto a substrate and its transformation into an adherent solid coating. During such a process, the solvent must be removed without adversely affecting the performance properties of the coating and without introducing defects into the coating. The drying step is therefore extremely important in defect formation because it is the last step in the process where the chemistry and physical properties of the product can be affected. For a perfect solid coating to form, the film must remain liquid long enough after deposition to allow the surface defects to flow out and disappear. However, if the wet coating remains as a low viscosity liquid for too long a time period, non-uniform airflow in the dryer can cause non-uniform flow of the wet coating at the surface, resulting in the formation of so-called drying mottle. Drying mottle is defined as an irregularly patterned defect that can be gross, and at times it can have an iridescent pattern. The iridescence pattern is very objectionable to a customer. For example, in the case of microfilm, customers normally view the image as the film is lighted from the backside. If the backing layer exhibits an iridescence pattern, it can have a deleterious effect on the ability of a customer to view the image.

For coating compositions comprising solution polymers, the viscosity of the coating during drying is a strong function of polymer concentration. Their film formation ability is therefore very good, the dried film is uniform, and its surface is fairly smooth. For aqueous coating compositions comprising water insoluble polymer particles, the viscosity build-up during drying is a very slow function of solids. The wet coating surface is therefore very prone to air disturbance and to surface tension forces. Consequently, films formed from aqueous coating compositions comprising water insoluble polymer particles often exhibit an objectionable iridescence pattern.

Film formation from aqueous coating compositions comprising water insoluble polymer particles also involves particle packing and deformation. Particles have to experience a significant amount of deformation to form a continuous, transparent film. The pressure profile due to particle elastic deformation is such that the particle is in compression at the center of the particle and in tension at the edges. As long as there is no polymer flow or polymer chain diffusion across the particle-particle interface, as is the case in photographic support coating applications due to very limited dryer length and very short drying time, the particle-particle interface is very weak, and internal stress will tend to separate the particles along that interface. Unless the dried coating experiences further heat relaxation at high temperature, the internal stress will persist and result in adhesion failure at the particle-particle interface or the particle-substrate interface.

In recent years, the conditions under which imaging elements are manufactured and utilized have become even more severe. This is either because applications for imaging elements have been extended to more severe environments or conditions, for example, higher temperatures must be withstood during manufacturing, storage, or use, or because manufacturing and processing speeds have been increased for greater productivity. Under these conditions, the above mentioned methods to obtain aqueous coating compositions free of organic solvents become deficient with regard to simultaneously satisfying all of the physical, chemical, and manufacturing requirements for an aqueous coating for imaging applications. For example, the image elements are more severely scratched during high speed finishing processes. A foremost objective of the present invention is therefore to provide an aqueous coating composition which is essentially free of organic solvent, has excellent film forming characteristics under drying conditions used for imaging support manufacturing processes, and forms a dried layer free of drying mottle that has excellent resistance to physical scratch and abrasion and excellent adhesion to underlying and overlying layers. The coating compositions of the invention have wide utility as auxiliary layers for imaging elements, and are especially useful as backing layers, subbing layers, primer layers, and barrier layers.

SUMMARY OF THE INVENTION

In accordance with the present invention, an image element comprises a support having thereon at least one auxiliary layer coated from an aqueous coating solution having therein a film forming binder, wherein the binder comprises a vinylidene chloride interpolymer containing carboxylic acid groups. The interpolymer contains from 60 to 90 weight percent vinylidene chloride and has an acid number of from 30 to 150. The carboxylic acid groups of the interpolymer are reacted with ammonia or amine to provide a pH of the composition of about 7 to 10.

DESCRIPTION OF THE INVENTION

The imaging elements to which this invention relates can be of many different types depending on the particular use for which they are intended. Such elements include, for example, photographic, electrophotographic, electrostatographic, photothermographic, migration, electrothermographic, dielectric recording and thermal-dye-transfer imaging elements.

The support materials in this invention can comprise various polymeric films, papers, glass, and the like, but both acetate and polyester supports well known in the art are preferred. The thickness of the support is not critical. Support thicknesses of 2 to 10 mil (0.002 to 0.010 inches) can be used. The polyester supports typically employ an undercoat or subbing layer well known in the art that comprises a vinylidene chloride/methyl acrylate/itaconic acid terpolymer or vinylidene chloride/acrylonitrile/acrylic acid terpolymer. The layers of this invention can be employed as subbing layers, interlayers, overcoat layers, backing layers, receiving layers, barrier layers, timing layers, antihalation layers, antistatic layers, stripping layers, transparent magnetic layers, and the like. The layers in accordance with this invention are particularly advantageous due to superior physical properties including exceptional transparency, resistance to scratches and abrasion, and excellent adhesion to underlying and overlying layers.

Coating compositions for forming the layers in accordance with the present invention comprise a continuous aqueous phase having therein a film forming binder, wherein the binder comprises a vinylidene chloride interpolymer containing carboxylic acid groups. The carboxylic acid groups of the interpolymer are reacted with ammonia or amine to provide a pH of the composition of about 7 to 10.

The vinylidene chloride containing interpolymers useful for the present invention include those obtained by interpolymerizing vinylidene chloride, one or more ethylenically unsaturated monomers containing carboxylic acid groups, and other ethylenically unsaturated monomers including, for example, alkyl esters of acrylic or methacrylic acid such as methyl methacrylate, ethyl methacrylate, butyl methacrylate, ethyl acrylate, butyl acrylate, hexyl acrylate, n-octyl acrylate, lauryl methacrylate, 2-ethylhexyl methacrylate, nonyl acrylate, benzyl methacrylate, the hydroxyalkyl esters of the same acids such as 2-hydroxyethyl acrylate, 2-hydroxyethyl methacrylate, and 2-hydroxypropyl methacrylate, the nitrile and amides of the same acids such as acrylonitrile, methacrylonitrile, and methacrylamide, vinyl acetate, vinyl propionate, vinyl chloride, and vinyl aromatic compounds such as styrene, t-butyl styrene and vinyl toluene, dialkyl maleates, dialkyl itaconates, dialkyl methylene-malonates, isoprene, and butadiene. Suitable ethylenically unsaturated monomers containing carboxylic acid groups include acrylic monomers such as acrylic acid, methacrylic acid, ethacrylic acid, itaconic acid, maleic acid, fumaric acid, monoalkyl itaconate including monomethyl itaconate, monoethyl itaconate, and monobutyl itaconate, monoalkylmaleate including monomethyl maleate, monoethyl maleate, and monobutyl maleate, citraconic acid, and styrenecarboxylic acid.

The interpolymer contains from 60 to 90 weight percent, preferably 70 to 85 weight percent, vinylidene chloride. The high vinylidene chloride content in the interpolymer insures excellent adhesion to bare polyester film support, vinylidene chloride containing undercoat layers commonly used on polyester film support, and overlying gelatin containing layers. In addition, vinylidene chloride imparts excellent barrier properties and abrasion resistance to the interpolymer.

The amount of the carboxylic acid containing ethylenically unsaturated monomer contained in the interpolymer is such that the acid number for the interpolymer is 30 to 150, preferably 40 to 100. Acid number is in general determined by titration and is defined as the number of milligrams of KOH required to neutralize 1 gram of the polymer. If the acid number is less than 30, the resultant coating may have poor film forming properties.

The use of vinylidene chloride containing interpolymers as undercoat or primer layers on polyester imaging support is well known in the art. These interpolymers comprise, for example, a vinylidene chloride/methyl acrylate/itaconic acid terpolymer or vinyldiene chloride/acrylonitrile/acrylic acid terpolymer as described in U.S. Pat. Nos. 2,627,088, 2,698,235, 2,698,240, 2,943,937, 3,143,421, 3,201,249, 3,271,178 and 3,501,301. In the prior art, these undercoat layer coating compositions frequently contain a compound such as resorcinol which simultaneously serves as a "biting" agent to improve adhesion to the polyester film base and acts as a coalescing aid to improve the film forming properties of the vinylidene chloride containing interpolymer. The coating compositions described in the present invention have excellent film forming characteristics and do not require the use of coalescing aids, including compounds such as resorcinol which are undesirable from a health and environmental standpoint.

U.S. Pat. No. 4,954,430 describes vinylidene chloride containing subbing layers applied onto polyester film support to improve the dimensional stability of the photographic element. This patent teaches that these layers may be applied either from aqueous or solvent coating compositions. U.S. Pat. No. 4,994,353 describes subbing layers applied onto polyester film support to improve the dimensional stability of the photographic element which contain a copolymer comprising from 70 to 99.9 weight percent vinylidene chloride and from 0.1 to 5 weight percent of a carboxyl group containing vinyl monomer. In this prior art, the subbing layer coating composition may contain, in addition to the vinylidene chloride copolymer latex, acids or alkalis for pH adjustments. However, this prior art reference does not teach or suggest the benefits of coating compositions containing a vinylidene chloride interpolymer containing carboxylic acid groups in which the carboxylic acid groups of the interpolymer are reacted with ammonia or amine to provide a pH of the composition of about 7 to 10. In fact, all of the example coating compositions taught in the '353 patent have a pH of 6.0, which would not provide the benefits of the present invention with respect to film forming properties.

The vinylidene-chloride containing interpolymers according to the present invention may be prepared by conventional solution polymerization methods, bulk polymerization methods, emulsion polymerization methods, suspension polymerization methods, or dispersion polymerization methods. The polymerization process is initiated in general with free radical initiators. Free radicals of any sort may be used. Preferred initiators include persulfates (such as ammonium persulfate, potassium persulfate, etc.), peroxides (such as hydrogen peroxide, benzoyl peroxide, cumene hydroperoxide, tertiary butyl peroxide, etc.), azo compounds (such as azobiscyanovaleric acid, azoisobutyronitrile, etc.), and redox initiators (such as hydrogen peroxide-iron(II) salt, potassium persulfate-sodium hydrogen sulfate, etc.). Common chain transfer agents or mixtures thereof known in the art, such as alkyl-mercaptans, can be used to control the polymer molecular weight.

When solution polymerization is employed, examples of suitable solvent medium include ketones such as methyl ethyl ketone, methyl butyl ketone, esters such as ethyl acetate, butyl acetate, ethers such as ethylene glycol monobutyl ether, and alcohols such as 2-propanol, 1-butanol. The resultant vinyl polymer can be redispersed in water by neutralizing with an amine or ammonia. The organic solvent is then removed by heating or distillation. In this regard, organic solvents which are compatible with water are preferred to be used as reaction medium during solution polymerization. Suitable examples of amines which can be used in the practice of the present invention include diethyl amine, triethyl amine, isopropyl amine, ethanolamine, diethanolamine, morpholine and the like.

A preferred method of preparing the vinylidene chloride containing interpolymers of the present invention is by an emulsion polymerization process where ethylenically unsaturated monomers are mixed together with a water soluble initiator and a surfactant. The emulsion polymerization process is well-known in the art (see, for example, Padget, J. C. in *Journal of Coating Technology*, Vol 66, No. 839, pages 89–105, 1994; El-Aasser, M. S. and Fitch, R. M. Ed. *Future Directions in Polymer Colloids*, NATO ASI Series, No 138, Martinus Nijhoff Publishers, 1987; Arshady, R. *Colloid & Polymer Science*, 1992, No 270, pages 717–732; Odian, G. *Principles of Polymerization*, 2nd Ed. Wiley (1981); and Sorenson, W. P. and Campbell, T. W. *Prepara-* tion Method of Polymer Chemistry, 2nd Ed, Wiley (1968)). The polymerization process is initiated with free radical initiators. Free radicals of any sort can be used. Preferred initiators include those already described. Surfactants which can be used include, for example, a sulfate, a sulfonate, a cationic compound, an amphoteric compound, or a polymeric protective colloid. Specific examples are described in "McCUTCHEON'S Volume 1: Emulsifiers & Detergents, 1995, North American Edition".

The vinylidene chloride containing polymer particles made by emulsion polymerization are further treated with ammonia or amine to neutralize carboxylic acid groups and adjust the dispersion to pH values from 7 to 10.

Crosslinking comonomers can be used in the emulsion polymerization to lightly crosslink the polymer particles. It is preferred to keep the level of the crosslinking monomers low so as not to affect the polymer film forming characteristics. Preferred crosslinking comonomers are monomers which are polyfunctional with respect to the polymerization reaction, including esters of unsaturated monohydric alcohols with unsaturated monocarboxylic acids, such as allyl methacrylate, allyl acrylate, butenyl acrylate, undecenyl acrylate, undecenyl methacrylate, vinyl acrylate, and vinyl methacrylate, dienes such as butadiene and isoprene, esters of saturated glycols or diols with unsaturated monocarboxylic acids, such as ethylene glycol diacrylate, ethylene glycol dimethacrylate, triethylene glycol dimethacrylate, 1,4-butanediol dimethacrylate, 1,3-butanediol dimethacrylate, and polyfunctional aromatic compounds such as divinyl benzene.

The coating compositions of the present invention may include other polymer binders in addition to the carboxylic acid containing vinylidene chloride interpolymer described above. These other polymer binders may be either water soluble or water dispersible and may be film forming or non-film-forming. Examples of such polymer binders include, for example, gelatin, water dispersible polyurethanes, and non-film-forming colloidal polymeric particles. In accordance with the present invention, the carboxylic acid containing vinylidene chloride interpolymer comprises at least 25% of the total weight of polymer binder in the coating composition.

Any of the types of gelatin commonly used in the imaging art may be used in the coating compositions of the present invention, including, alkali-treated gelatin (cattle bone or hide gelatin), acid-treated gelatin (pigskin gelatin), and gelatin derivatives such as acetylated gelatin or phthalated gelatin.

Anionic, cationic, or nonionically stabilized aqueous polyurethane dispersions can be prepared. Anionic dispersions usually contain either carboxylate or sulphonate functionalized co-monomers, e.g., suitably hindered dihydroxy carboxylic acids (dimethylol propionic acid) or dihydroxy sulphonic acids. Cationic systems are prepared by the incorporation of diols containing tertiary nitrogen atoms, which are converted to the quaternary ammonium ion by the addition of a suitable alkylating agent or acid. Nonionically stabilized aqueous polyurethanes can-be prepared by the use of diol or diisocyanate co-monomers bearing pendant polyethylene oxide chains. Such polyurethane dispersions are colloidally stable over a broad pH range. Combinations of nonionic and anionic stabilization are sometimes utilized to achieve a combination of small particle size and strong stability, such polyurethane dispersions are often referred to as "universal" polyurethane dispersions. For the coating compositions of the present invention, anionic, nonionic, or universal polyurethane dispersions are preferred.

Non-film-forming colloidal polymeric particles suitable for use in the present invention include those described in U.S. Pat. Nos. 5,366,855 and 5,477,832. Such polymeric particles are those which do not form clear films when an aqueous coating formulation comprising 3 weight percent of the polymer particles is applied onto a sheet of transparent support material at a wet coverage of 10 cc/m$^2$ and dried for 2 minutes at 75° C. These non-film-forming polymer particles comprise glassy polymers that provide resistance to blocking, ferrotyping, abrasion, and scratches. These polymers include addition-type polymers and interpolymers prepared from ethylenically unsaturated monomers such as acrylates including acrylic acid, methacrylates including methacrylic acid, acrylamides and methacrylamides, itaconic acid and its half esters and diesters, styrenes including substituted styrenes, acrylonitrile and methacrylonitrile, vinyl acetates, vinyl ethers, vinyl and vinylidene halides, and olefins. In addition, crosslinking and graft-linking monomers such as 1,4-butyleneglycol methacrylate, trimethylolpropane triacrylate, allyl methacrylate, diallyl phthalate, divinyl benzene, and the like may be used. These polymeric particles may include reactive functional groups capable of forming covalent bonds by intermolecular crosslinking or by reaction with a crosslinking agent. Suitable reactive functional groups include: hydroxyl, carboxyl, carbodiimide, epoxide, aziridine, vinyl sulfone, sulfinic acid, active methylene, amino, amide, allyl, and the like. The colloidal polymeric particles can be prepared either by emulsion polymerization or by emulsifying pre-formed polymers in water with a proper dispersing agent.

The coating composition in accordance with the invention may contain suitable crosslinking agents which can react with carboxylic acid groups or hydroxyl groups including epoxy compounds, polyfunctional aziridines, methoxyalkyl melamines, triazines, polyisocyanates, carbodiimides, and the like. The use of a crosslinking agent in the coating composition is especially preferred when the auxiliary layer of the invention is used as a backing layer or as a barrier layer to protect an underlying antistatic layer since crosslinking the vinylidene chloride interpolymer improves its physical properties and makes the dried layer more impermeable to film processing solutions.

Matte particles well known in the art may also be used in the coating composition of the invention, such matting agents have been described in Research Disclosure No. 308119, published December 1989, pages 1008 to 1009. When polymer matte particles are employed, the polymer may contain reactive functional groups capable of forming covalent bonds with the binder polymer by intermolecular crosslinking or by reaction with a crosslinking agent in order to promote improved adhesion of the matte particles to the coated layers. Suitable reactive functional groups include: hydroxyl, carboxyl, carbodiimide, epoxide, aziridine, vinyl sulfone, sulfinic acid, active methylene, amino, amide, allyl, and the like.

The coating composition of the present invention may also include lubricants or combinations of lubricants to reduce the sliding friction of the photographic elements in accordance with the invention. Typical lubricants include (1) silicone based materials disclosed, for example, in U.S. Pat. Nos. 3,489,567, 3,080,317, 3,042,522, 4,004,927, and 4,047,958, and in British Patent Nos. 955,061 and 1,143,118; (2) higher fatty acids and derivatives, higher alcohols and derivatives, metal salts of higher fatty acids, higher fatty acid esters, higher fatty acid amides, polyhydric alcohol esters of higher fatty acids, etc disclosed in U.S. Pat. Nos. 2,454,043, 2,732,305, 2,976,148, 3,206,311, 3,933,516, 2,588,765, 3,121,060, 3,502,473, 3,042,222, and 4,427,964, in British Patent Nos. 1,263,722, 1,198,387, 1,430,997, 1,466,304, 1,320,757, 1,320,565, and 1,320,756, and in German Patent Nos. 1,284,295 and 1,284,294; (3) liquid paraffin and paraffin or wax like materials such as carnauba wax, natural and synthetic waxes, petroleum waxes, mineral waxes and the like; (4) perfluoro- or fluoro- or fluorochloro-containing materials, which include poly (tetrafluoroethlyene), poly(trifluorochloroethylene), poly (vinylidene fluoride, poly(trifluorochloroethylene-co-vinyl chloride), poly(meth)acrylates or poly(meth)acrylamides containing perfluoroalkyl side groups, and the like. Lubricants useful in the present invention are described in further detail in Research Disclosure No.308119, published December 1989, page 1006.

In the present invention, other additional compounds may be added to the coating, depending on the functions of the particular layer, including surfactants, emulsifiers, coating aids, rheology modifiers, inorganic fillers such as conductive and non-conductive metal oxide particles, pigments, magnetic particles, biocide, and the like. The coating composition may also include a small amount of organic solvent, preferably the concentration of organic solvent is less than 1 percent by weight of the total coating composition.

The coating composition of the invention can be applied by any of a number of well-know techniques, such as dip coating, rod coating, blade coating, air-knife coating, gravure coating and reverse roll coating, extrusion coating, slide coating, curtain coating, and the like. After coating, the layer is generally dried by simple evaporation, which may be accelerated by known techniques such as convection heating. Known coating and drying methods are described in further detail in Research Disclosure No. 308119, Published December 1989, pages 1007 to 1008. When the coating compositions of the invention are to be used as subbing or undercoat layers on bare polymeric support it is desirable to apply the coating composition onto a discharge treated support surface. Discharge treatment of polymeric support materials to improve wetting and adhesion of applied coatings is well known in the art. This discharge treatment can be by, for example, plasma or corona discharge.

In a particularly preferred embodiment, the imaging elements of this invention are photographic elements, such as photographic films, photographic papers or photographic glass plates, in which the image-forming layer is a radiation-sensitive silver halide emulsion layer. Such emulsion layers typically comprise a film-forming hydrophilic colloid. The most commonly used of these is gelatin and gelatin is a particularly preferred material for use in this invention. Useful gelatins include alkali-treated gelatin (cattle bone or hide gelatin), acid-treated gelatin (pigskin gelatin) and gelatin derivatives such as acetylated gelatin, phthalated gelatin and the like. Other hydrophilic colloids that can be utilized alone or in combination with gelatin include dextran, gum arabic, zein, casein, pectin, collagen derivatives, collodion, agar-agar, arrowroot, albumin, and the like. Still other useful hydrophilic colloids are water-soluble polyvinyl compounds such as polyvinyl alcohol, polyacrylamide, poly (vinylpyrrolidone), and the like.

The photographic elements of the present invention can be simple black-and-white or monochrome elements comprising a support bearing a layer of light-sensitive silver halide emulsion or they can be multilayer and/or multicolor elements.

Color photographic elements of this invention typically contain dye image-forming units sensitive to each of the three primary regions of the spectrum. Each unit can be comprised of a single silver halide emulsion layer or of multiple emulsion layers sensitive to a given region of the spectrum. The layers of the element, including the layers of the image-forming units, can be arranged in various orders as is well known in the art.

A preferred photographic element according to this invention comprises a support bearing at least one blue-sensitive silver halide emulsion layer having associated therewith a yellow image dye-providing material, at least one green-sensitive silver halide emulsion layer having associated therewith a magenta image dye-providing material and at least one red-sensitive silver halide emulsion layer having associated therewith a cyan image dye-providing material.

In addition to emulsion layers, the photographic elements of the present invention can contain one or more auxiliary layers conventional in photographic elements, such as overcoat layers, spacer layers, filter layers, interlayers, antihalation layers, pH lowering layers (sometimes referred to as acid layers and neutralizing layers), timing layers, opaque reflecting layers, opaque light-absorbing layers and the like. The support can be any suitable support used with photographic elements. Typical supports include polymeric films, paper (including polymer-coated paper), glass and the like. Details regarding supports and other layers of the photographic elements of this invention are contained in *Research Disclosure*, Item 36544, September, 1994.

The light-sensitive silver halide emulsions employed in the photographic elements of this invention can include coarse, regular or fine grain silver halide crystals or mixtures thereof and can be comprised of such silver halides as silver chloride, silver bromide, silver bromoiodide, silver chlorobromide, silver chloroiodide, silver chorobromoiodide, and mixtures thereof. The emulsions can be, for example, tabular grain light-sensitive silver halide emulsions. The emulsions can be negative-working or direct positive emulsions. They can form latent images predominantly on the surface of the silver halide grains or in the interior of the silver halide grains. They can be chemically and spectrally sensitized in accordance with usual practices. The emulsions typically will be gelatin emulsions although other hydrophilic colloids can be used in accordance with usual practice. Details regarding the silver halide emulsions are contained in *Research Disclosure*, Item 36544, September, 1994, and the references listed therein.

The photographic silver halide emulsions utilized in this invention can contain other addenda conventional in the photographic art. Useful addenda are described, for example, in *Research Disclosure*, Item 36544, September, 1994. Useful addenda include spectral sensitizing dyes, desensitizers, antifoggants, masking couplers, DIR couplers, DIR compounds, antistain agents, image dye stabilizers, absorbing materials such as filter dyes and UV absorbers, light-scattering materials, coating aids, plasticizers and lubricants, and the like.

Depending upon the dye-image-providing material employed in the photographic element, it can be incorporated in the silver halide emulsion layer or in a separate layer associated with the emulsion layer. The dye-image-providing material can be any of a number known in the art, such as dye-forming couplers, bleachable dyes, dye developers and redox dye-releasers, and the particular one employed will depend on the nature of the element, and the type of image desired.

Dye-image-providing materials employed with conventional color materials designed for processing with separate solutions are preferably dye-forming couplers; i.e., compounds which couple with oxidized developing agent to form a dye. Preferred couplers which form cyan dye images are phenols and naphthols. Preferred couplers which form magenta dye images are pyrazolones and pyrazolotriazoles. Preferred couplers which form yellow dye images are benzoylacetanilides and pivalylacetanilides.

The present invention will now be described in detail with reference to examples; however, the present invention should not be limited to these examples.

The examples demonstrate the benefits of the aqueous coating compositions of the present invention, and in particular show that the coating compositions of the present invention have excellent film-forming characteristics under drying conditions typically used in the photographic support manufacturing process. The coated layer exhibits superior physical properties including exceptional transparency, resistance to abrasion, adhesion to underlying and overlying layers, and barrier properties.

EXAMPLES

An aqueous latex polymer (Polymer P-1) comprising 15 weight percent acrylonitrile, 79 weight percent vinylidene chloride, and 6 weight percent acrylic acid was prepared using emulsion polymerization techniques. The latex so prepared has a pH of 2.3, a glass transition temperature (Tg) of 42° C., and an acid number of 47.

The pH of Polymer P-1 was adjusted to a value of 9.0 with a 20 weight percent triethyl amine solution. This neutralized polymer latex was used in the example coatings.

A terpolymer latex comprising 65 weight percent methyl methacrylate, 25 weight percent butyl acrylate, and 10 weight percent methacrylic acid was prepared by emulsion polymerization techniques. This polymer (Polymer P-2) has a Tg of 73° C. and an acid number of 65. The pH of this polymer latex was adjusted to a value of 9.0 with 20 weight percent triethyl amine solution.

Example 1

The following example demonstrates that coating compositions of the invention are useful as an abrasion resistant backing layer. A polyethylene terephthalate film support that had been subbed with a terpolymer latex of vinylidene chloride, methyl acrylate, and itaconic acid was coated with an aqueous coating solution having a pH of 9.0 and comprising 6.67 weight percent polymer P-1 and 0.67 weight percent polyfunctional aziridene crosslinking agent (CX100, sold by Zeneca Resins Inc.) and the coating dried at 100° C. for 2 minutes to give a backing layer with a dry coating weight of 1076 mg/m$^2$, this sample is Example 1.

Comparative Sample A was prepared in an analogous manner using polymer P-2 in place of polymer P-1.

Comparative Sample B was prepared by coating a 7 weight percent solution of Elvacite 2041 methyl methacrylate polymer (Tg of 105° C.) sold by ICI Acrylics Inc. in methylene chloride onto the aforementioned subbed polyester film support to give a dried layer with a coating weight of 1076 mg/m$^2$.

The Taber abrasion resistance for these coatings was measured in accordance with the procedure set forth in ASTM D1044. The coating compositions and results are reported in Table 1.

TABLE 1

| Coating | Polymer | pH | Taber abrasion % haze | Appearance |
|---|---|---|---|---|
| Sample A | P-2 | 9 | 15.8 | Excellent |
| Sample B | Elvacite 2041 | — | 9.0 | Excellent |
| Example 1 | P-1 | 9 | 11.9 | Excellent |

The results in Table 1 show that coatings of the invention give highly transparent coatings that provide superior abrasion resistance to the higher Tg acrylic latex of Sample A and nearly comparable abrasion resistance to a solvent applied acrylic resin having a very much higher Tg value.

Example 2

The following example demonstrates that coating compositions of the invention are useful as a protective overcoat for antistatic layers. A polyethylene terephthalate film support that had been subbed with a terpolymer latex of vinylidene chloride, methyl acrylate, and itaconic acid was coated with an aqueous antistatic formulation comprising 0.025 weight percent of silver-doped vanadium pentoxide, 0.075 weight percent of a terpolymer latex of methylacrylate, vinylidene chloride, and itaconic acid (15/83/2) and dried at 100° C. to yield an antistatic layer having a dry weight of about 8 mg/m$^2$. An aqueous coating solution having a pH of 9.0 and comprising 6.67 weight percent polymer P-1 and 0.67 weight percent polyfunctional aziridene crosslinking agent (CX100, sold by Zeneca Resins Inc.) was applied onto the above mentioned antistatic layer and the coating dried at 100° C. for 2 minutes to give a protective overcoat layer with a dry coating weight of 1076 mg/m$^2$, this sample is Example 2. An analogous sample (Comparative Sample C) was prepared using polymer P-1 in an overcoat coating composition with a pH of 3.0

It is known (described in U.S. Pat. Nos. 5,006,451 and 5,221,598) that the antistatic properties 5 of the vanadium pentoxide layer are destroyed after film processing if not protected by an impermeable barrier. Thus the permeability of the protective overcoat layer could be evaluated by measuring the antistatic properties of the samples after processing in conventional film developing and fixing solutions.

The samples were soaked in high pH (11.3) developing and fixing solutions as described in U.S. Pat. No. 4,269,929, at 38° C. for 60 seconds each and then rinsed in distilled water. The internal resistivity (using the salt bridge method, described in R. A. Elder, "Resistivity Measurements on Buried Conductive Layers", EOS/ESD Symposium Proceedings, September 1990, pages 251–254.) of the processed samples at 20% relative humidity was measured and compared with the internal resistivity before processing, the results are given in Table 2.

TABLE 2

| Coating | Polymer | pH | Coating Appearance | Resistivity before processing, Ω/□ | Resistivity after processing, Ω/□ |
|---|---|---|---|---|---|
| Sample C | P-1 | 3 | hazy | $1.2 \times 10^7$ | $1.2 \times 10^8$ |
| Example 2 | P-1 | 9 | excellent | $1.2 \times 10^7$ | $1.2 \times 10^7$ |

The results in Table 2 show that coatings of the invention protect an underlying antistatic layer from even the harshest film processing solutions. A comparative coating containing the same polymer composition that was not adjusted to a pH of 7 to 10 had reduced transparency and gave an order of magnitude loss in antistatic properties indicating poorer film formation properties compared to the coating of the invention.

Example 3

The following example demonstrates coating compositions of the invention comprising a mixture of a neutralized carboxylic acid containing vinylidene chloride interpolymer and a water dispersible polyurethane. An aqueous coating solution comprising 4.67 weight percent polymer P-1 having a pH of 9.0, 2.0 weight % of Neorez R960 aqueous dispersible polyurethane (sold by Zeneca Resins Inc.), and 0.67 weight percent polyfunctional aziridene crosslinking agent (CX100, sold by Zeneca Resins Inc.) was applied onto the antistatic layer described in the previous example and the coating dried at 100° C. for 2 minutes to give a protective overcoat layer with a dry coating weight of 1076 mg/m$^2$, this sample is Example 3. An analogous coating composition (Comparative Sample D) was prepared using polymer P-1 which had not been neutralized with triethyl amine and had a pH of 2.3, 2.0 weight percent Neorez R960, and 0.67 weight percent CX100 crosslinking agent. The samples were evaluated for Taber abrasion resistance and resistivity after processing in the above described manner.

There is an abrupt loss in colloidal stability for most commercially available polyurethane dispersions at the pKa of the stabilizing acid group as the pH of the dispersion is reduced from a value above the pKa of the acid. When a carboxylic acid is used as the stabilizing moiety for the polyurethane, as is the case for Neorez R960, the polyurethane dispersion is unstable below a pH of about 6. Coating compositions of Comparative Sample D which had a pH value less than 6 were unstable and a protective overcoat layer could not be prepared from this formulation. On the other hand, coating compositions of the invention (Example 3) had excellent stability and gave highly transparent dried layers with a Taber abrasion resistance value of 13.5 and a resistivity before and after processing of 1.6×10$^7$ Ω/□.

Example 4 and 5

The following examples demonstrate coating compositions of the invention comprising a mixture of a neutralized carboxylic acid containing vinylidene chloride interpolymer and water dispersible, non-film-forming polymer particles. Aqueous coating solutions comprising a mixture of polymer P-1 having a pH of 9.0, a methyl methacrylate/methacrylic acid 97/3 latex (PMMA-MAA latex) having a particle size of 60 nm and a Tg of 120° C., and polyfunctional aziridene crosslinking agent (CX100, sold by Zeneca Resins Inc.) were applied onto the antistatic layer described in the previous examples and the coatings dried at 100° C. for 2 minutes to give protective overcoat layers with a dry coating weight of 1076 mg/m$^2$, these samples are Examples 4 and 5. Analogous coating compositions (Comparative Samples E and F) were prepared using a mixture of polymer P-1 which had not been neutralized with triethyl amine and had a pH of 2.3, PMMA-MAA latex, and CX100 crosslinking agent. Comparative Sample G was prepared by applying a coating composition comprising 6.7 weight percent of the PMMA-MAA latex and 0.67 weight percent CX100 crosslinking agent. The samples were evaluated for coating appearance, Taber abrasion resistance, and resistivity after processing in the above described manner, the results are given in Table 3. Coatings of the invention give dried layers with superior transparency due to the excellent film forming properties of the compositions. Examples 4 and 5 also provide excellent abrasion resistance and barrier properties. On the other hand, the comparative coating compositions give hazy or powdery coatings that could not be tested for abrasion resistance due to their lack of transparency.

TABLE 3

| Coating | composition | pH | Coating Appearance | Taber abrasion, % haze | Resistivity before processing, Ω/□ | Resistivity after processing, Ω/□ |
| --- | --- | --- | --- | --- | --- | --- |
| Sample E | P-1/PMMA-MAA latex 50/50 | 3 | hazy | not tested | 1.2 × 10$^7$ | 1.2 × 10$^7$ |
| Sample F | P-1/PMMA-MAA latex 30/70 | 3 | hazy | not tested | 1.2 × 10$^7$ | 2.0 × 10$^7$ |
| Sample G | PMMA-MAA latex | 3 | white, powdery film | not tested | 1.2 × 10$^7$ | >1.0 × 10$^3$ |
| Example 4 | P-1/PMMA-MAA latex 50/50 | 9 | excellent | 8.4 | 1.2 × 10$^7$ | 1.2 × 10$^7$ |
| Example 5 | P-1/PMMA-MAA latex 30/70 | 9 | excellent | 10.7 | 1.2 × 10$^7$ | 1.6 × 10$^7$ |

*coatings contained 20 weight % CX100 crosslinking agent based on total polymer weight

Examples 6 to 9

The following examples demonstrate that coating compositions of the invention may be used as subbing layers on film support. Coatings comprising a mixture of neutralized polymer P-1 and gelatin (lime-processed bone gelatin) having a pH of 8 were applied onto either a polyethylene terephthalate film support that had been subbed with a terpolymer latex of vinylidene chloride, methyl acrylate, and itaconic acid or a corona discharge treated bare polyethylene terephthalate film support. The coatings were dried at 100° C. to give layers with a dry coating weight of 150 mg/m$^2$. Onto these subbing layers of the invention was applied a 10 weight percent gelatin solution containing bis(vinyl methyl) sulfone hardener to simulate overcoating the subbing layers with a photographic emulsion or curl control layer. This gelatin layer was chill set at 15° C. and dried at 40° C. to give a dried coating weight of 4500 mg/m$^2$.

Dry adhesion of the gelatin overcoat to the subbing layer was determined by scribing small hatch marks in the coating with a razor blade, placing a piece of high tack tape over the scribed area, and then quickly pulling the tape from the surface. The amount of the scribed area removed is a measure of the dry adhesion. Wet adhesion for the samples was tested by placing the samples in developing and fixing solutions at 35° C. for 1 minute each and then rinsing in distilled water. While still wet, the surface of the gelatin coating was rubbed vigorously with a finger, the amount of the coating removed is a measure of wet adhesion. The description of the coatings and the results are given in Table 4.

TABLE 4

| Coating   | Composition      | Support               | Dry Adhesion, amount removed | Wet Adhesion, amount removed |
|-----------|------------------|-----------------------|------------------------------|------------------------------|
| Example 6 | P-1/gelatin 30/70 | Subbed polyester     | none                         | none                         |
| Example 7 | P-1/gelatin 30/70 | Corona treated polyester | none                      | none                         |
| Example 8 | P-1/gelatin 50/50 | Subbed polyester     | none                         | none                         |
| Example 9 | P-1/gelatin 50/50 | Corona treated polyester | none                      | none                         |

The results presented in Table 4 show that coating compositions of the invention provide excellent adhesion to discharge treated bare support, subbed support, and overlying gelatin layers.

While there as been shown and described what are at present considered the preferred embodiments of the invention, it will be obvious to those skilled in the art that various alterations and modifications may be made without departing from the scope of the invention as defined by the appended claims. All such modifications are intended to be included in the present application.

We claim:

1. An imaging element comprising a support having thereon at least one layer formed by coating and subsequent drying of an aqueous coating composition having dispersed therein a film forming binder comprising an interpolymer containing carboxylic acid groups, the interpolymer comprising from 60 to 90 weight percent vinylidene chloride, the interpolymer having an acid number of from 30 to 150 wherein the carboxylic acid groups are reacted with ammonia or amine so that the aqueous coating composition has a pH of from 7 to 10.

2. The imaging element according to claim 1 wherein the interpolymer containing 60 to 90 weight percent vinylidene chloride is obtained by interpolymerizing vinylidene chloride with one or more ethylenically unsaturated monomers containing carboxylic acid groups with other ethylenically unsaturated monomers.

3. The imaging element of claim 2 wherein the ethylenically unsaturated monomers containing carboxylic acid groups are selected from the group consisting of acrylic monomers, monoalkyl itaconates, monoalkyl maleates, citraconic acid and styrene carboxylic acid.

4. The imaging element according to claim 2 wherein the other ethylenically unsaturated monomers are selected from the group consisting of alkyl esters of acrylic acid, alkyl esters of methacrylic acid, hydroxyalkyl esters of acrylic acid, hydroxyalkyl esters of methacrylic acid, nitriles of acrylic acid, nitriles of methacrylic acid, amides of acrylic acid, amides of methacrylic acid, vinyl acetate, vinyl propionate, vinyl chloride, vinyl aromatic compounds, dialkyl maleates, dialkyl itaconates, dialkyl methylenemaleates, isoprene and butadiene.

5. The imaging element of claim 1 wherein the coating composition further comprises a crosslinking agent.

6. The imaging element of claim 1 wherein the coating composition further comprises matte particles.

7. The imaging element of claim 1 wherein the coating composition comprises a lubricant.

8. The imaging element of claim 1 wherein the at least one layer comprises a subbing layer.

9. The imaging element of claim 1 wherein the coating composition further comprises gelatin.

10. The imaging element of claim 1 wherein the coating composition further comprises polyurethane.

11. The imaging element of claim 1 wherein the coating composition further comprises non-film-forming polymer particles.

12. An aqueous coating composition for use in an imaging element comprising an aqueous medium having dispersed therein a film forming binder comprising an interpolymer containing carboxylic acid groups, the interpolymer comprising from 60 to 90 weight percent vinylidene chloride, the interpolymer having an acid number of from 30 to 150 wherein the carboxylic acid groups are reacted with ammonia or amine so that the aqueous coating composition has a pH of from 7 to 10.

13. The coating composition according to claim 12 wherein the interpolymer containing 60 to 90 weight percent vinylidene chloride is obtained by interpolymerizing vinylidene chloride with one or more ethylenically unsaturated monomers containing carboxylic acid groups with other ethylenically unsaturated monomers.

14. The coating composition of claim 13 wherein the ethylenically unsaturated monomers containing carboxylic acid groups are selected from the group consisting of acrylic monomers, monoalkyl itaconates, monoalkyl maleates, citraconic acid and styrene carboxylic acid.

15. The imaging element according to claim 13 wherein the other ethylenically unsaturated monomers are selected from the group consisting of alkyl esters of acrylic acid, alkyl esters of methacrylic acid, hydroxyalkyl esters of acrylic acid, hydroxyalkyl esters of methacrylic acid, nitriles of acrylic acid, nitriles of methacrylic acid, amides of acrylic acid, amides of methacrylic acid, vinyl acetate, vinyl propionate, vinyl chloride, vinyl aromatic compounds, dialkyl maleates, dialkyl itaconates, dialkyl methylenemalonates, isoprene and butadiene.

16. The coating composition of claim 12 further comprises a crosslinking agent.

17. The coating composition of claim 12 wherein the coating composition further comprises matte particles.

18. The coating composition of claim 12 wherein the coating composition comprises a lubricant.

19. The coating composition of claim 12 further comprises gelatin.

20. The coating composition of claim 12 further comprises polyurethane.

21. The coating composition of claim 12 further comprises non-film-forming polymer particles.

* * * * *